(12) United States Patent  (10) Patent No.: US 7,311,003 B2
Thelen  (45) Date of Patent: Dec. 25, 2007

(54) METHOD AND DEVICE FOR BALANCING JOURNAL-LESS ROTORS

(75) Inventor: Dieter Thelen, Modautal (DE)

(73) Assignee: Schenck RoTec GmbH, Darmstadt (DE)

( * ) Notice: Subject to any disclaimer, the term of this patent is extended or adjusted under 35 U.S.C. 154(b) by 296 days.

(21) Appl. No.: 10/542,568

(22) PCT Filed: Mar. 2, 2004

(86) PCT No.: PCT/DE2004/000389

§ 371 (c)(1),
(2), (4) Date: Jul. 18, 2005

(87) PCT Pub. No.: WO2004/081512

PCT Pub. Date: Sep. 23, 2004

(65) Prior Publication Data

US 2006/0144141 A1  Jul. 6, 2006

(30) Foreign Application Priority Data

Mar. 10, 2003 (DE) .................................. 103 10 725

(51) Int. Cl.
*G01M 1/16* (2006.01)
(52) U.S. Cl. .......................................... 73/471; 73/472
(58) Field of Classification Search .................. 73/459, 73/460, 462, 471, 472, 473
See application file for complete search history.

(56) References Cited

U.S. PATENT DOCUMENTS

| 1,486,115 A | 3/1924 | Allen |
| 3,570,278 A | 3/1971 | Lannen |
| 4,543,825 A | 10/1985 | Schönfeld et al. |

FOREIGN PATENT DOCUMENTS

| CH | 542 436 | 9/1973 |
| DE | 2 123 505 | 5/1971 |
| DE | 44 41 951 A1 | 5/1996 |
| EP | 004266 A1 | 10/1979 |
| EP | 0 104 266 A1 | 4/1984 |
| GB | 1350522 | * 4/1974 |

OTHER PUBLICATIONS

Endert, H.: Das Strömungslager als Bauelement der Feinmechanik In: Feingerätetechnik, 4. vol. 7, Jul. 1955, pp. 291-296.
International Search Report for PCT/DE2004/000389.

* cited by examiner

*Primary Examiner*—John E. Chapman
(74) *Attorney, Agent, or Firm*—Collard & Roe, P.C.

(57) ABSTRACT

In the case of a bearing with a bearing mandrel for mounting a journal-less rotor with a bore hole in a balancing device, in which the bearing mandrel has openings for fluid to pass through, to be able to determine the imbalance of rotors with bearing possibilities on only part of their axial extent with high precision, in the bearing mandrel first openings for fluid delivery and second openings for liquid removal are provided.

19 Claims, 4 Drawing Sheets

METHOD AND DEVICE FOR BALANCING JOURNAL-LESS ROTORS

CROSS REFERENCE TO RELATED APPLICATIONS

Figure 1:
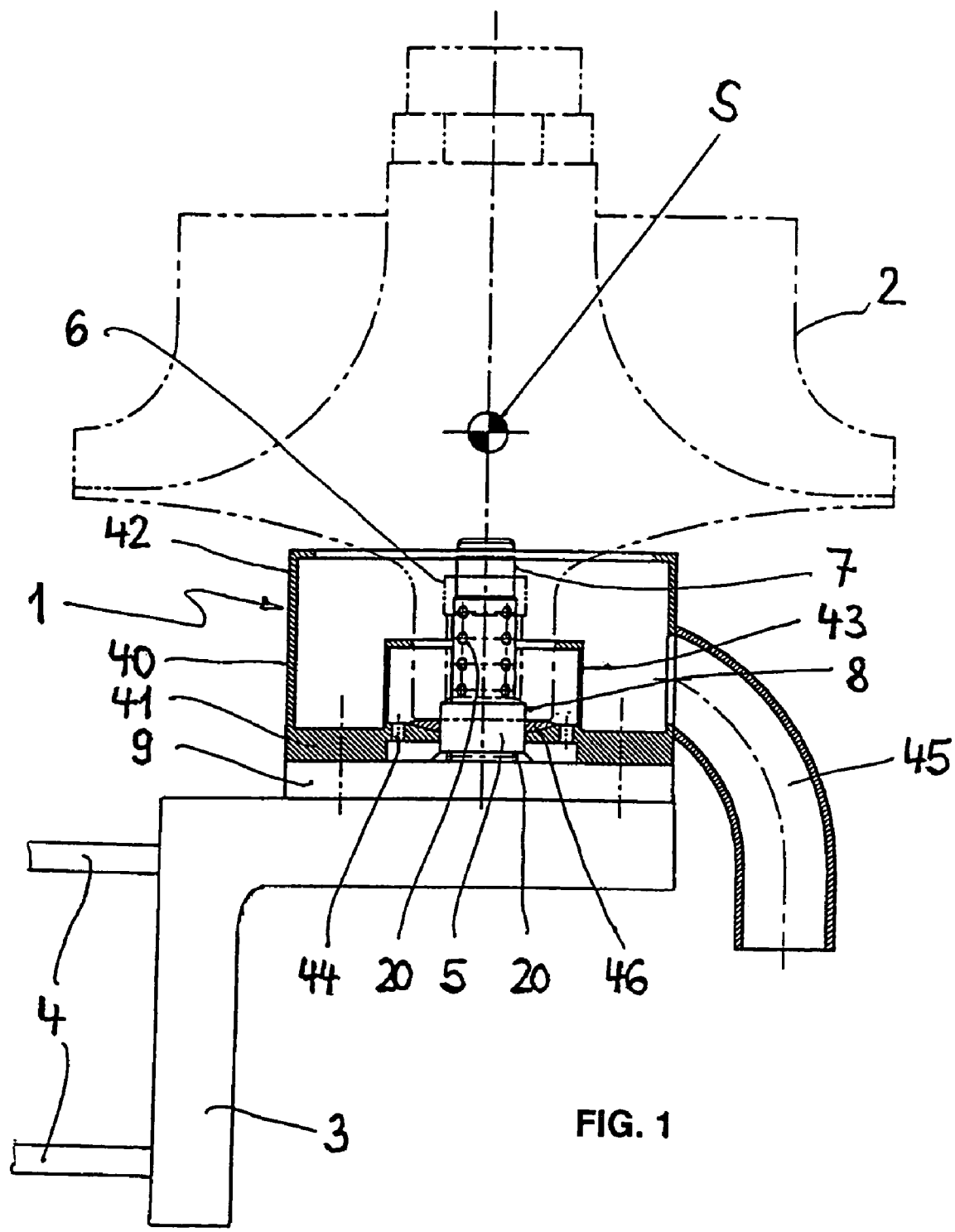

Applicant claims priority under 35 U.S.C. §119 of German Application No. 10310 725.8 filed Mar. 10, 2003. Applicant also claims priority under 35 U.S.C. §365 of PCT/DE2004/000389 filed Mar. 2, 2004. The international application under PCT article 21(2) was not published in English.

The invention concerns a method of balancing journal-less rotors, and a bearing with a bearing mandrel for mounting a journal-less rotor with a bore hole in a balancing device.

A rotor with journals can be precisely balanced in relation to its bearing positions, which are arranged on the journals. If rotors without their own bearing positions are to be balanced, and are mounted on an auxiliary shaft for balancing, they create problems regarding the achievable balancing quality.

From EP 0 104 266 A1, a method by which journal-less rotors can be balanced with high balancing quality without an auxiliary shaft is known. For this purpose, the rotor is mounted on a bearing mandrel of a balancing machine, and air which is fed between the rotor and mandrel bearing surfaces, which are opposite each other, is used as the bearing fluid. Faults caused by surface imprecisions no longer occur, because the characteristics of the hydro-static bearing mandrel eliminate the effects of fit tolerances and surface irregularities and provide a stable axis of rotation for the rotor. However, with certain forms of rotor, for example journal-less rotors of which the center of gravity is outside the provided bearing region on the rotor, the use of air as the bearing fluid causes imprecise results.

In EP 0 104 266 A1, the use of liquid as the bearing fluid is also mentioned, but without taking into account these special rotor forms and the problems which result from the use of liquid, particularly regarding the removal of the liquid. Inappropriate liquid removal can result in wetting of the rotor and thus in impermissible falsification of the measurement result.

It is an object of the invention to provide a method and a device for balancing journal-less rotors, which can determine with high precision rotor imbalance even on only a part of the axial extent of the rotor.

According to the invention, this object is achieved by in one aspect by a method in which the rotor is supported in a first bearing region in the radial direction hydrostatically by means of a liquid and in a second bearing region in the axial direction by means of fluid which is preferably delivered without pressure, and delivery and removal are at least partly carried out via the inside of the bearing mandrel. In another aspect, this object is achieved by a bearing in which first openings, which are connected to delivery conduits for the fluid, and second openings, which are connected to removal conduits for the fluid, are provided in the bearing mandrel.

For the first time, journal-less rotors for which only part of their longitudinal extent is available for the bearing can be balanced with high precision, since with the invention high bearing rigidity and precise fixing of the rotor axis are ensured, and the rotor runs very smoothly. Additionally, through the liquid bearing according to the invention, the required separation of the imbalance in relation to the equalization planes is ensured. Because the delivery and removal take place mainly via the inside of the mandrel, there is no negative effect on the measurement precision by the bearing liquid.

In a development of the invention, it is provided that the support is given in both the first and the second bearing region by means of liquid, preferably an oil or oil-containing liquid, which simplifies the delivery and removal of the fluid which is used.

The axial support of the rotor in the second bearing region can advantageously take place hydrodynamically, since it is then relatively easy to supply the bearing fluid.

Because the support in the second bearing region takes place on bearing surfaces of spherical form, possible axial runout errors of the axial bearing surface cannot cause a movement of the rotor axis. Because of the angular mobility of the spherical bearing, axial runout errors can be compensated without a forcing moment being exerted on the rotor.

Figure 2:
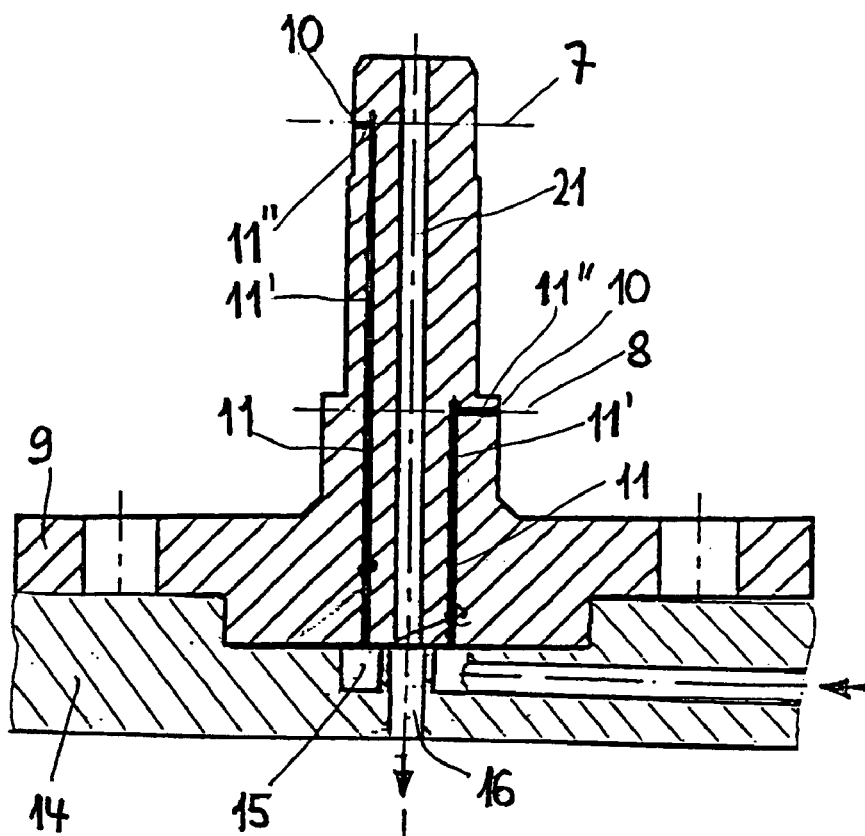
Figure 3:
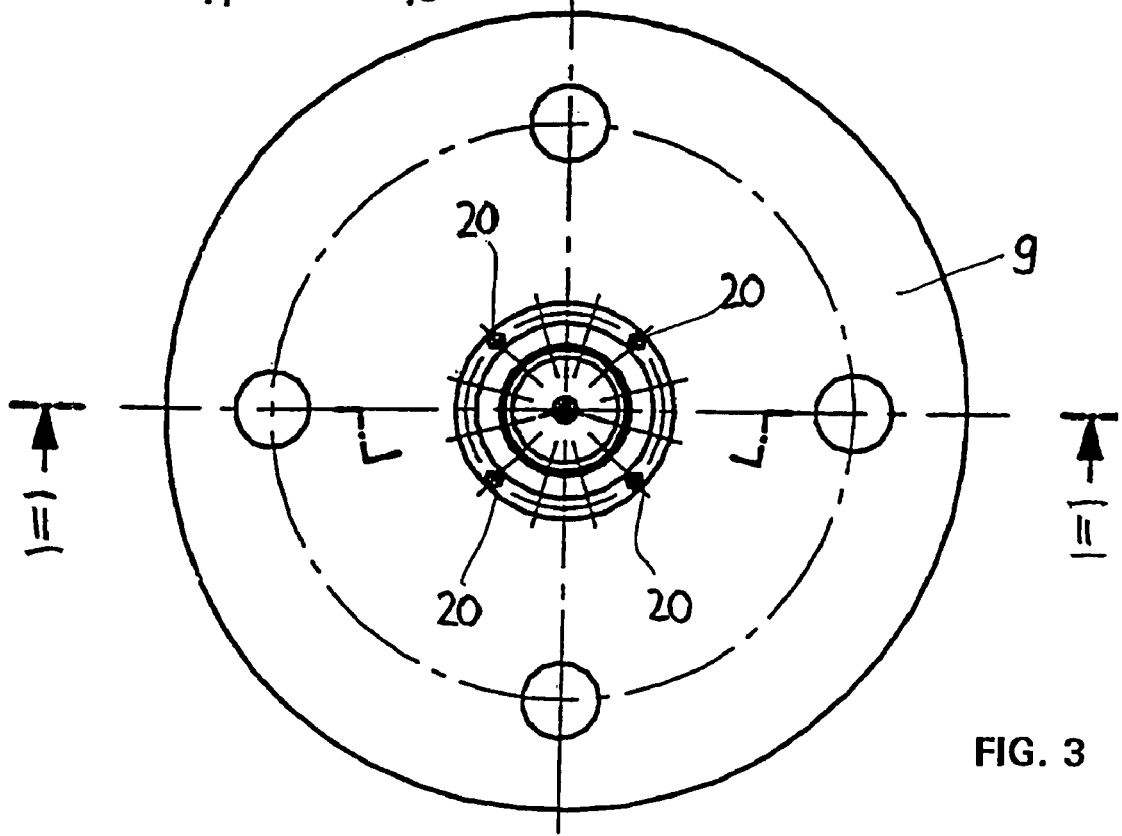
Figure 4:
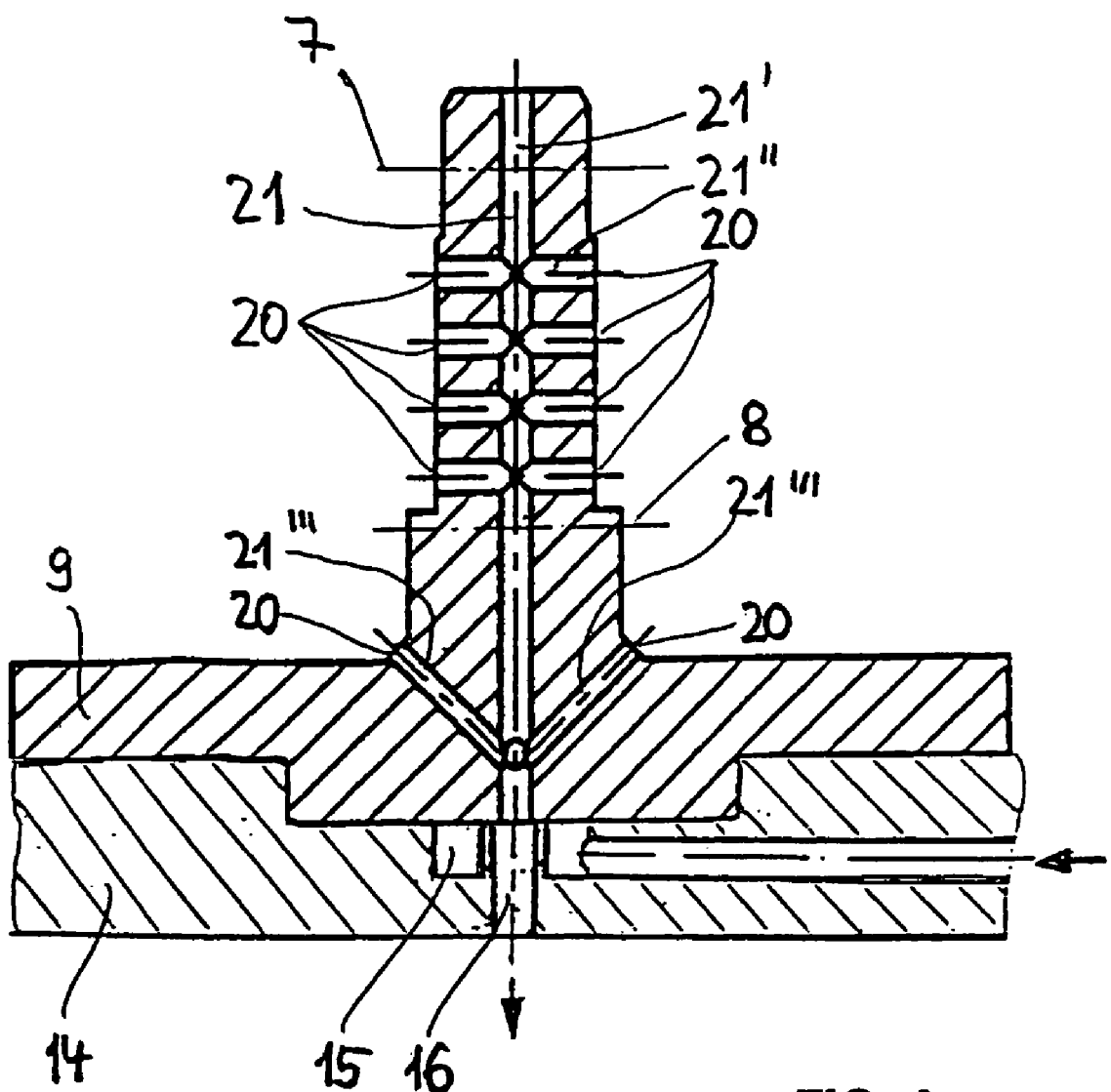
Figure 5:
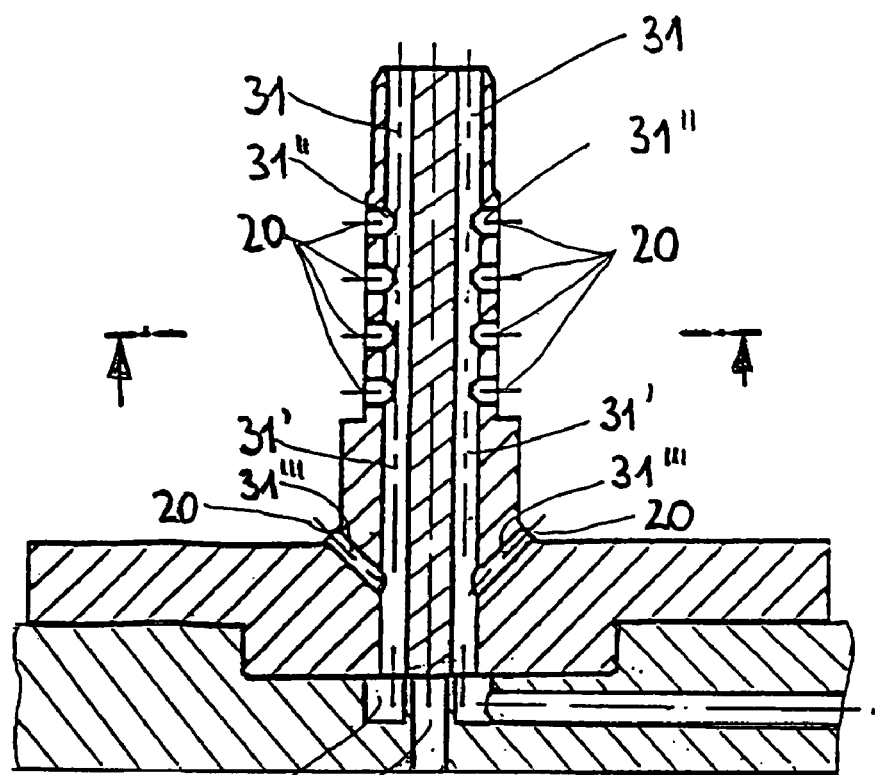
Figure 6:
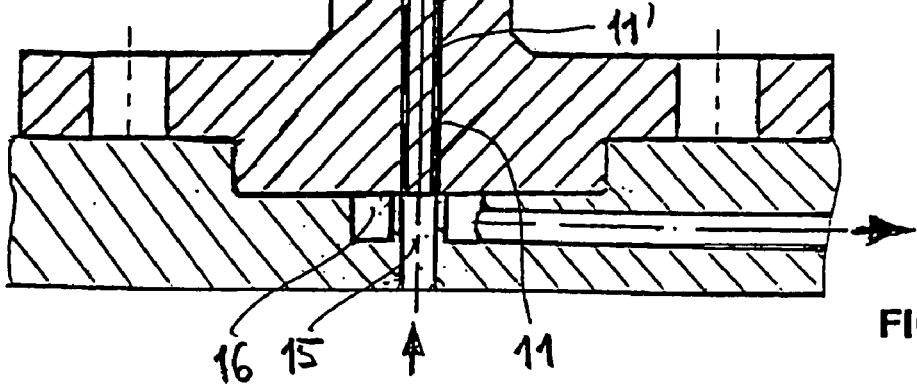
Figure 7:
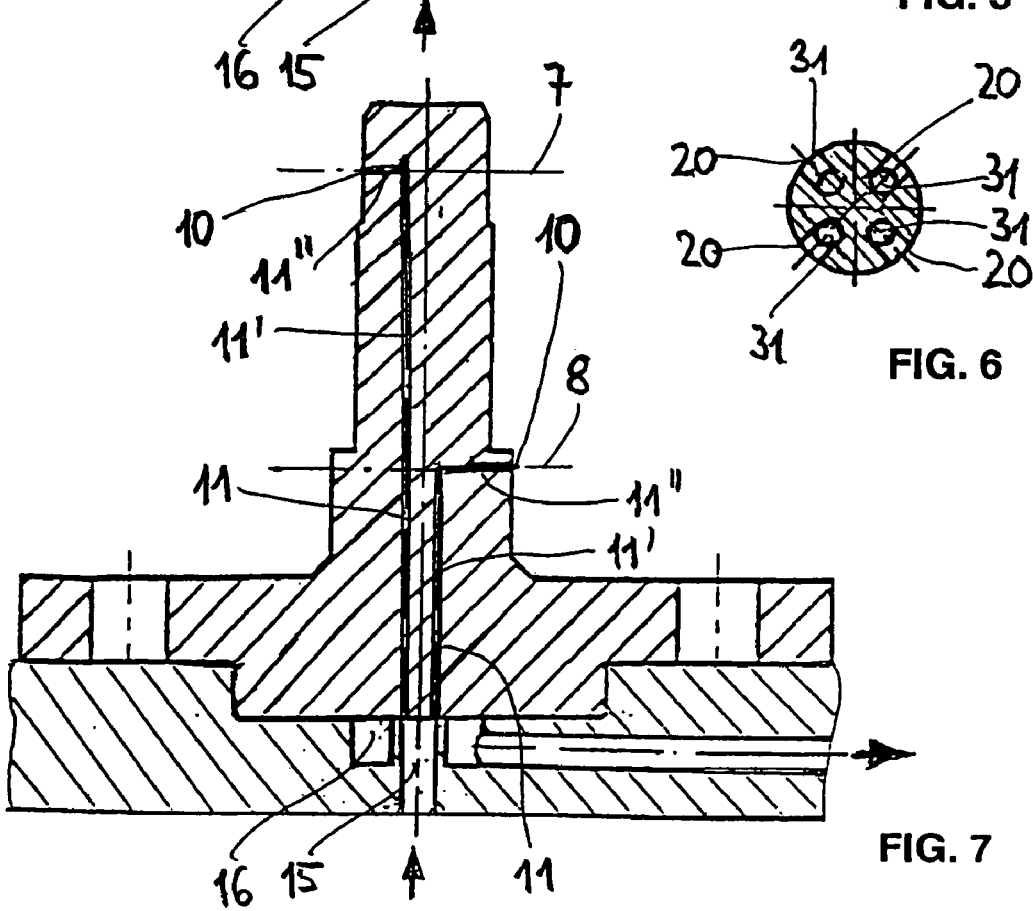

The invention is explained in more detail below on the basis of embodiments. In the drawings:

FIG. 1 shows a schematic illustration of a bearing with a bearing mandrel for a rotor with a blind bore hole in a balancing device, FIG. 2 shows a first embodiment of the bearing mandrel in a sectional illustration along the line II-II in FIG. 3, FIG. 3 is a plan view of the bearing mandrel according to FIG. 2, FIG. 4 is a further sectional illustration of the bearing mandrel according to FIG. 2, FIG. 5 shows a further embodiment of the bearing mandrel in a sectional illustration, FIG. 6 is a cross-section through the bearing mandrel according to FIG. 5, and FIG. 7 is a further sectional illustration of the bearing mandrel according to FIG. 5.

The bearing 1 which is shown in FIG. 1, for a rotor 2 which is to be investigated, and which is shown in FIG. 1 in dashed-dotted lines, is fixed on an oscillating bridge 3 of a balancing device. The oscillating bridge 3 is supported in the conventional way via, for instance, four supporting springs 4, of which only two are shown here, so that it can oscillate against the frame of the balancing device. The rotor 2 is put into rotation by a drive, which is not shown in more detail here. Imbalance-inducing oscillations of the oscillating bridge 3 are measured and used to determine the imbalance to be compensated on the rotor 2.

The bearing has a bearing mandrel 5, on which the rotor 2 to be investigated or balanced is mounted so that it can be rotated.

In the embodiment according to FIG. 1, the rotor 2 has a non-through central rotor bore hole 6, i.e. a blind bore hole, by means of which it is supported on the vertically arranged bearing mandrel 5. The center of gravity S of the rotor 2 lies in the axial direction outside the extent of the blind bore hole, i.e. outside the bearing region. The blind bore hole is stepped and has four portions of different diameter. The first portion, which goes out from the lower rotor face, like the fourth portion at the end of the blind bore hole, is intended to support the rotor 2 by means of bearing fluid in a first region in the radial direction on the bearing mandrel 5. The rotor 2 is supported by means of bearing fluid in a second region in the axial direction via the lower rotor face and assigned regions or components of the bearing mandrel 5. As the bearing fluid in this embodiment, in the first and second bearing regions oil or a liquid containing oil, or another fluid which is suitable for liquid lubrication is used.

The bearing mandrel 5 has on its surface first openings 10 (FIG. 2, FIG. 7), which are connected to fluid delivery conduits 11 within the bearing mandrel, for bearing fluid to pass through, and second openings 20, which are connected to fluid removal conduits 21 within the bearing mandrel, for bearing fluid to pass through. The first openings 10 are in two axially separated bearing planes 7, 8, which are assigned to the first and fourth portions of the blind bore hole of the rotor 2 and in which the rotor 2 is supported in the radial direction. The bearing mandrel 5 has at one end a collar 9, by which it is fixed on the oscillating bridge 3.

In the configuration of the bearing mandrel 5 shown in FIGS. 2 to 4, the fluid delivery for each of the two bearing planes 7, 8 takes place in each case via four delivery conduit portions 11', which are distributed equidistantly on a reference circle, run parallel to the bearing mandrel axis, and are connected to delivery conduit portions 11" which run radially and end in the four first openings 10 per bearing plane 7, 8. The axially running delivery conduit portions 11', of which there are eight in total, end in a first fluid chamber 15 which is arranged on the lower face of the bearing mandrel 5 and is preferably in the form of a ring chamber. The ring chamber is connected to a fluid delivery means, and is in a chamber component 14 which is sealedly connected to the bearing mandrel 5 and is itself part of the oscillating bridge 3. The bearing mandrel 5 and chamber component 14 can of course also be in the form of one part.

The delivery conduit portions 11', which run parallel to the bearing mandrel axis, are provided with choke portions, which have a small cross-section for the purpose of a choke effect on the fluid. The choke effect can easily be adjusted via the length of the choke portion, as well as by the chosen cross-section. It is also possible to provide that the assigned radially running conduit portions 11" also have a choke effect.

For fluid removal via the openings 20, in this configuration of the bearing mandrel a through central bore hole 21' is provided as part of the fluid removal conduit 21, into which a plurality of radial bore holes 21" open in each of a plurality of sectional planes, as can be seen more clearly in FIG. 4. These sectional planes are between the two bearing planes 7, 8. In the second bearing region, the purpose of which is to support the rotor in the axial direction, there are a plurality of openings 20, which are connected via radially and obliquely running—fluid channels 21'" to the central bore hole 21', for fluid removal. The central bore hole 21' ends in a second fluid chamber 16, which is arranged on the lower face of the bearing mandrel 5 and is formed as a central chamber. The central chamber is connected to a fluid suction means, and like the ring chamber is in the chamber component 14, which is sealedly connected to the bearing mandrel 5.

In a further configuration of the bearing mandrel 5, shown in FIGS. 5 to 7, the fluid feed for each of the two bearing planes 7, 8 also takes place in each case via four delivery conduit portions 11', which are distributed equidistantly on a reference circle, run parallel to the bearing mandrel axis, and are connected to delivery conduit portions 11" which run radially. In contrast to the previously described configuration, the axial delivery conduit portions 11' end in the central chamber, which in this case forms the first fluid chamber 15 for fluid delivery. The choke effect is adjusted as for the previously described configuration.

However, in the case of this configuration no central bore hole which is connected to all fluid removal openings 20 is provided. Instead, four through bore holes 31, which are distributed equidistantly on a reference circle, run parallel to the mandrel axis and are each connected in a plurality of sectional planes to an opening 20 on the circumference of the bearing mandrel are provided, as can be seen more clearly in FIGS. 5 and 6. The openings 20, which are each assigned to a through bore hole 31, accordingly lie one behind the other on a surface line which runs parallel to the bearing mandrel axis. Similarly to the above-described configuration, there are a plurality of, in this case four, openings 20 for fluid removal in the second bearing region, and of these, in this case, one is connected via radially and obliquely running fluid channels 31'" to the nearest through bore hole 31. The four through bore holes 31 end in a second fluid chamber 16, which is arranged on the lower face of the bearing mandrel 5 and is in the form of a ring chamber. The ring chamber is connected to a fluid suction means, and like the central chamber is in the chamber component 14, which is sealedly connected to the bearing mandrel.

The delivery openings 10 in the bearing regions can differ in number and arrangement from the described configurations. The choke effect is defined as a function of the rotor form and rotor weight and on what fluid is used.

The number and arrangement of the removal openings in the described configurations are given as examples. They depend on what fluid is used and the configuration of the rotor and bearing.

The bearing mandrel 5 is connected at its end with the collar 9 to a unit 40, the purpose of which is to support the rotor 2 in the axial direction and to supply fluid to this axial support. This unit 40 has a base plate 41, which is rigidly connected to the collar 9 of the bearing mandrel 5 on the collar side facing the bearing mandrel 5. The base plate forms the floor of two housing pots 42, 43, that is a first outer housing pot 42 and a second housing pot 43 of smaller diameter and arranged coaxially within the first housing pot 42. The height of the outer housing pot 42 is dimensioned so that the rotor portion which dips into it is enclosed by the upper edge of the housing pot with a small radial separation. The height of the second inner housing pot 43 is dimensioned so that a sufficient supply of fluid for hydrodynamic fluid lubrication of the axial support is collected in the inner housing pot 43.

The base plate 41 of the unit 40 simultaneously forms the bearing surface for axial support of the rotor 2 with its rotor face. These two surfaces are configured such that hydrodynamic support of the rotating rotor 2 by means of the bearing fluid which is collected in the inner housing pot 43 is ensured. The base plate 41 rest the inner housing pot 43 have recesses 44, via which the inner housing pot 43 is connected to the fluid removal conduits 21 rest. 31 in the bearing mandrel 5. Via the fluid suction means through the fluid removal conduits 21 rest. 31, the level of the fluid in the inner housing pot 43 can easily be regulated. Excess fluid goes from the outer housing pot 42 into an outflow 45 to the fluid reservoir.

In the configuration shown in FIG. 1, the rotor 2 has a flat face. To form a spherical bearing, between the bearing surface of the base plate 41 and the face of the rotor 2 a bearing disc 46 is arranged, which has a first flat face and a second spherical face, which with a complementarily formed indentation in the base plate 41 forms the spherical bearing. This spherical bearing is in the fluid stock inside the housing pot 43.

Instead of the device described above for hydrodynamic bearing with a liquid, with suitable rotors a hydrostatic axial bearing, for instance by means of an air bearing, can be provided. A fluid supply with air as the fluid can easily be fed as far as the base plate 41, which is connected to the collar 9 of the bearing mandrel 5, to openings in the bearing surface of the base plate 41. Hereby, the region of the axial bearing can be configured such that alternatively a hydrodynamic liquid bearing or a hydrostatic gas or air bearing can be used.

The orientation of the bearing mandrel axis, for example vertical, horizontal or an intermediate orientation, can be defined taking account of the configuration of the balancing device and the method of delivering the rotors, for example with automated insertion and withdrawal.

The bearing which is arranged on the oscillating bridge makes all measurement methods possible to determine the imbalance according to position and size. The support of the oscillating bridge can be in a form for subcritical or supercritical operation.

The invention is not restricted to investigation of rotors with blind bore holes. All rotors without their own bearing journals, but with blind bore holes or through bore holes, for example compressor wheels, flywheels, etc. can be balanced. The invention is specially suitable for rotors of which the center of gravity in the axial direction is outside the bearing region which is provided in the rotor bore hole, which applies in particular to rotors with the possibility of bearing on only part of their axial extent.

The invention claimed is:

1. A method of balancing journal-less rotors, in which a rotor with a bore hole is arranged on a bearing mandrel of a balancing device and fluid is brought between rotor and bearing mandrel surfaces which are opposite each other, and the rotor is put into rotation, imbalance-induced oscillations of the bearing mandrel being used to determine the imbalance, wherein the rotor is supported in a first bearing region in the radial direction hydrostatically by means of a liquid and in a second bearing region in the axial direction by means of fluid, and delivery and removal are at least partly carried out via the inside of the bearing mandrel;

wherein the bearing mandrel comprises first openings connected to delivery conduits for the fluid and second openings connected to removal conduits for the fluid;

wherein the first and second openings are each connected to conduit portions which run transversely to the bearing mandrel axis and conduit portions which run parallel to the bearing mandrel axis; and wherein the conduit portions of the delivery conduits have choke portions with a small cross-section.

2. The method according to claim 1, wherein the support is carried out in both the first and the second bearing region by means of an oil or oil-containing liquid as fluid.

3. The method according to claim 1, wherein the removal is carried out via the inside of the bearing mandrel and a further removal conduit which is connected to a container.

4. The method according to claim 1, wherein the rotor in the second bearing region is hydrodynamically supported.

5. The method according to claim 1, wherein the support in the first bearing region is provided by a plurality of bearing positions which are formed between the bearing mandrel circumference and the rotor bore hole, the rotor center of gravity lying in the axial direction outside the bearing region.

6. The method according to claim 1, wherein the support in the second bearing region is provided via spherically formed bearing surfaces.

7. A bearing with a bearing mandrel to support a journal-less rotor with a bore hole in a balancing device in at least a first and a second bearing region, the bearing mandrel having openings for fluid to pass through, wherein in the bearing mandrel first openings which are connected to delivery conduits for the fluid are provided, and second openings which are connected to removal conduits for the fluid are provided;

wherein the first and second openings are each connected to conduit portions which run transversely to the bearing mandrel axis and conduit portions which run parallel to the bearing mandrel axis; and wherein the conduit portions, which run transversely and/or parallel to the bearing mandrel axis, of the delivery conduits have choke portions with a small cross-section.

8. The bearing according to claim 7, wherein the first openings on bearing mandrel circumferences are at least in the first and/or second bearing region.

9. The bearing according to claim 7, wherein the first openings are in two axially separate bearing planes of the bearing mandrel.

10. The bearing according to claim 7, wherein the first openings are provided both in two axially separate bearing planes of a bearing region and in a bearing plane of a further bearing region, which is in the form of an axial bearing.

11. The bearing according to claim 7, wherein the second openings are adjacent to the bearing planes and/or arranged therebetween.

12. The bearing according to claim 7, wherein the conduit portions, which run parallel to the bearing mandrel axis, of the delivery conduits or removal conduits each open into a fluid chamber which is arranged on the bearing mandrel end, for fluid delivery and fluid suction.

13. The bearing according to claim 12, wherein the two fluid chambers are formed by a central chamber and a coaxial ring chamber.

14. The bearing according to claim 13, wherein the fluid chambers are formed in a chamber component which is sealedly connected to the bearing mandrel.

15. The bearing according to claim 7, wherein four openings per plane, equidistantly distributed on the bearing mandrel circumference, are provided.

16. The bearing according to claim 7, wherein the bearing mandrel is arranged vertically, and the rotor end which receives the bearing mandrel is supported via a spherically formed bearing position on the bearing mandrel or a unit which is connected thereto.

17. The bearing according to claim 16, wherein a bearing disc is provided between the rotor end and bearing mandrel or a unit which is connected to the bearing mandrel, said bearing disc having one plane face and one face in the shape of a universal ball joint.

18. The bearing according to claim 16, wherein the rotor end region with the spherically formed bearing position is surrounded by a housing pot for backflow fluid.

19. The bearing according to claim 18, wherein the housing pot is surrounded by another housing pot, and both are provided with removal conduits, of which that of the inner housing pot is connected to a fluid suction means via the openings in the bearing mandrel.

* * * * *